(12) United States Patent
Tiwari et al.

(10) Patent No.: US 8,966,466 B2
(45) Date of Patent: Feb. 24, 2015

(54) SYSTEM FOR PERFORMING FIRMWARE UPDATES ON A NUMBER OF DRIVES IN AN ARRAY WITH MINIMUM INTERRUPTION TO DRIVE I/O OPERATIONS

(75) Inventors: Prafull Tiwari, Lucknow (IN); Madan Mohan Munireddy, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 99 days.

(21) Appl. No.: 13/438,876

(22) Filed: Apr. 4, 2012

(65) Prior Publication Data
US 2013/0268922 A1 Oct. 10, 2013

(51) Int. Cl.
*G06F 9/44* (2006.01)
*G06F 9/445* (2006.01)

(52) U.S. Cl.
USPC ............................ 717/168; 717/170; 717/174

(58) Field of Classification Search
None
See application file for complete search history.

(56) References Cited

U.S. PATENT DOCUMENTS

| | | | |
|---|---|---|---|
| 6,728,833 B2 | 4/2004 | Pruett et al. | 711/114 |
| 6,816,950 B2* | 11/2004 | Nichols | 711/162 |
| 6,907,504 B2 | 6/2005 | Burton et al. | 711/162 |
| 7,032,218 B2* | 4/2006 | Shirasawa et al. | 717/168 |
| 7,191,437 B1* | 3/2007 | Coatney et al. | 717/174 |
| 7,426,633 B2 | 9/2008 | Thompson et al. | 713/2 |
| 7,558,915 B2 | 7/2009 | Cherian et al. | 711/114 |
| 8,219,794 B1* | 7/2012 | Wang et al. | 717/170 |
| 8,312,211 B2* | 11/2012 | Aono et al. | 711/112 |
| 8,375,385 B1* | 2/2013 | Harel et al. | 717/173 |
| 8,527,981 B2* | 9/2013 | Oikawa et al. | 717/174 |
| 8,713,553 B2* | 4/2014 | Suzuki | 717/174 |
| 8,745,614 B2* | 6/2014 | Banerjee et al. | 717/174 |
| 8,887,144 B1* | 11/2014 | Marr et al. | 717/168 |
| 2002/0166027 A1* | 11/2002 | Shirasawa et al. | 717/168 |
| 2003/0236970 A1* | 12/2003 | Palmer et al. | 717/170 |
| 2004/0264030 A1* | 12/2004 | Yang | 360/69 |
| 2008/0028385 A1* | 1/2008 | Brown et al. | 717/170 |
| 2008/0184217 A1* | 7/2008 | Kai | 717/168 |
| 2009/0063766 A1* | 3/2009 | Matsumura et al. | 717/168 |
| 2009/0077547 A1* | 3/2009 | Kakinoki | 717/168 |
| 2009/0210867 A1* | 8/2009 | Suzuki | 717/168 |
| 2009/0292873 A1* | 11/2009 | Aono et al. | 711/114 |
| 2010/0058322 A1 | 3/2010 | Oikawa et al. | 717/173 |
| 2010/0162223 A1* | 6/2010 | Hattori et al. | 717/168 |
| 2010/0175068 A1 | 7/2010 | Fifer et al. | 718/104 |
| 2010/0229166 A1* | 9/2010 | Mopur et al. | 717/168 |
| 2010/0235826 A1 | 9/2010 | Garcia et al. | 717/173 |

(Continued)

OTHER PUBLICATIONS

Ashwin Pawar, Understanding storage das-nas-san, [Online] Oct. 7, 2010, [Retrieved from the Internet] <http://www.slideshare.net/AshwinPawar/understanding-storage-dasnassan> 10 pages.*

(Continued)

*Primary Examiner* — Thuy Dao
*Assistant Examiner* — Ravi K Sinha
(74) *Attorney, Agent, or Firm* — Christopher P. Maiorana, PC (57) ABSTRACT

The present invention concerns an apparatus comprising a management utility and a processing utility. The management utility may be implemented on a host computer and be configured to initiate a request to apply a firmware update to a plurality of drives in an array. The processing utility may be implemented on a drive controller and may be configured to (i) determine which of the plurality of drives are in an idle state, (ii) send the firmware update to the drives determined to be in the idle state and (iii) repeat (i) and (ii) until all of the drives have been updated.

20 Claims, 5 Drawing Sheets

(56) References Cited

U.S. PATENT DOCUMENTS

| | | | |
|---|---|---|---|
| 2010/0313191 A1 | 12/2010 | Yin et al. ..................... | 717/168 |
| 2011/0022828 A1 | 1/2011 | Delaney et al. ................ | 713/2 |
| 2011/0107317 A1* | 5/2011 | Nolterieke et al. ........... | 717/168 |
| 2012/0117555 A1* | 5/2012 | Banerjee et al. .............. | 717/168 |
| 2012/0260242 A1* | 10/2012 | Nguyen et al. ................ | 717/168 |
| 2012/0278795 A1* | 11/2012 | Bouchier et al. .............. | 717/170 |

OTHER PUBLICATIONS

Hou, R.Y.; Menon, J.; Patt, Y.N., Balancing I/O response time and disk rebuild time in a RAID5 disk array, [Online] 1993, System Sciences, 1993, Proceeding of the Twenty-Sixth Hawaii International Conference on , vol. i, No., pp. 70,79 vol. 1, 5-8 [Retrieved from the Internet] <http://ieeexplore.ieee.org/stamp/stamp.jsp?tp=&arnumber=270756>.*

Pruett et al., BladeCenter systems management software, [Online] 2005, IBM Journal of Research and Development , vol. 49, No. 6, pp. 963,975, Nov. 2005, [Retrieved from the Internet] <http://ieeexplore.ieee.org/stamp/stamp.jsp?tp=&arnumber=5388766&isnumber=5388752>.*

Menon, J.; Kasson, J., Methods for improved update performance of disk arrays, [Online] 1992, System Sciences, 1992. Proceedings of the Twenty-Fifth Hawaii International Conference on , vol. i, No., pp. 74,83 vol. 1, Jan. 7-10, 1992, [Retrieved from the Internet] <http://ieeexplore.ieee.org/stamp/stamp.jsp?tp=&arnumber=183147&isnumber=4716>.*

* cited by examiner

| SLOT NUMBER | VENDOR ID | PRODUCT ID | DEVICE ID | CURRENT FIRMWARE VERSION | UPDATE REQUIRED? | POWER STATE |
| --- | --- | --- | --- | --- | --- | --- |
| 1 | SEAGATE | ST9146803SS | 26 | 2.10 | YES | POWER SAVE/IDLE |
| 2 | HITACHI | HT8143904HS | 27 | 3.10 | NO | ON |
| ... | ... | ... | ... | ... | ... | ... |
| 8 | HITACHI | HT8153805HS | 32 | 2.05 | YES | ON |

SYSTEM FOR PERFORMING FIRMWARE UPDATES ON A NUMBER OF DRIVES IN AN ARRAY WITH MINIMUM INTERRUPTION TO DRIVE I/O OPERATIONS

FIELD OF THE INVENTION

The present invention relates to drive arrays generally and, more particularly, to a method and/or apparatus for performing drive firmware updates on a number of drives in an array with minimum interruption to drive input/output (I/O) operations.

BACKGROUND OF THE INVENTION

In conventional drive arrays, drive firmware updates are carried out without monitoring input/output (I/O) activity on the drives. In such systems, a customer (or end user) can initiate a drive update of the firmware at any point using a management application. With such an implementation, there is a risk that the firmware updates lead to data corruption or I/O timeouts if there is heavy I/O traffic on the drives during such firmware updates.

It would be desirable to implement a method and/or apparatus for performing firmware updates to a number of drives in an array with minimum interruptions to drive input/output (I/O) operations.

SUMMARY OF THE INVENTION

The present invention concerns an apparatus comprising a management utility and a processing utility. The management utility may be implemented on a host computer and be configured to initiate a request to apply a firmware update to a plurality of drives in an array. The processing utility may be implemented on a drive controller and may be configured to (i) determine which of the plurality of drives are in an idle state, (ii) send the firmware update to the drives determined to be in the idle state and (iii) repeat (i) and (ii) until all of the drives have been updated.

The objects, features and advantages of the present invention include providing a system for performing drive updates that may (i) be implemented on a number of drives in an array, (ii) be implemented with a minimum of interruption to I/O activity and/or (iii) provide one or more safeguards if drive activity occurs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
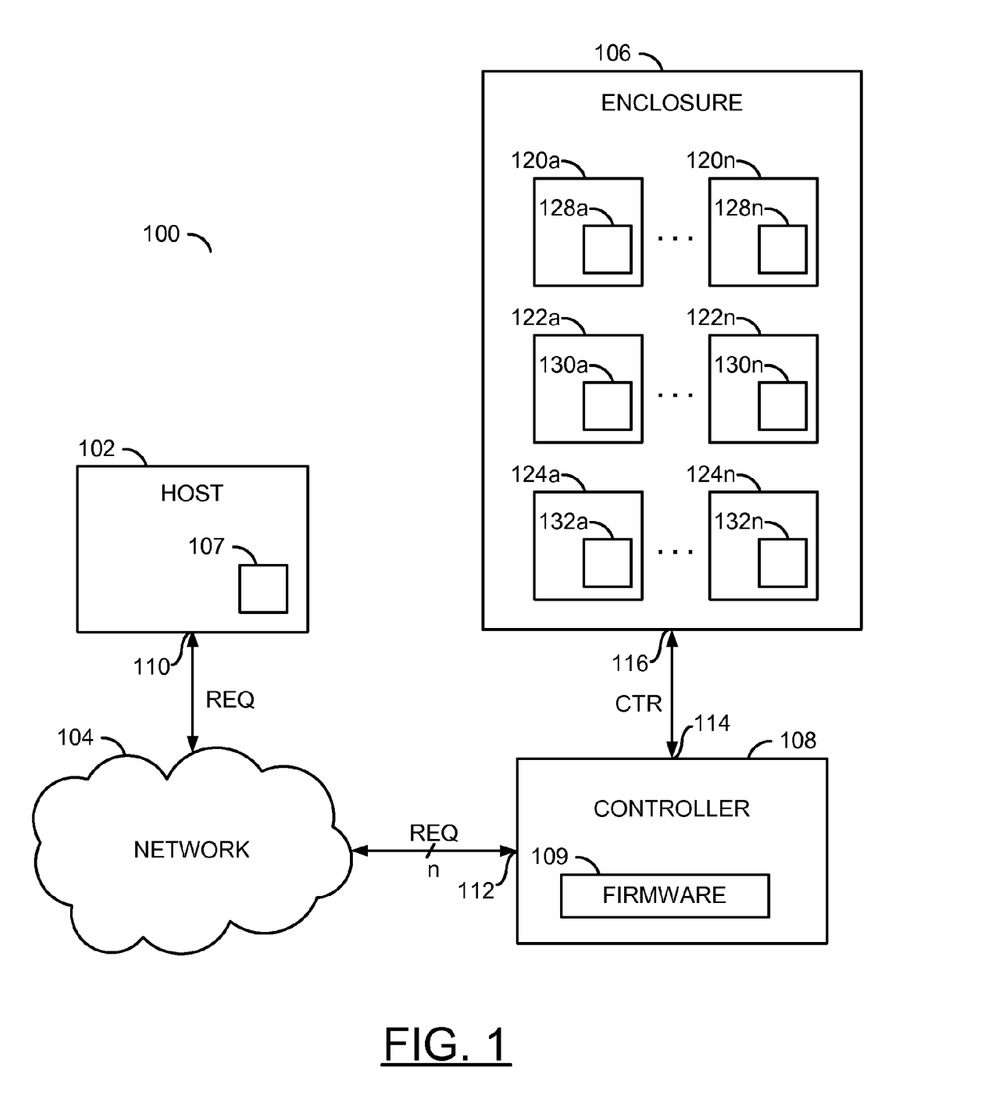
FIG. 1 is a diagram of an example context of the present invention.

Referring to FIG. 1, a block diagram of a system 100 is shown illustrating a context of the present invention. The system 100 generally comprises a block (or circuit) 102, a network 104, a block (or circuit) 106 and a block (or circuit) 108. The circuit 102 may be implemented as a host. The host 102 may be implemented as one or more computers in a host/client configuration. The host 102 may include a block (or module, or circuit) 107. The block 107 may be implemented as a management utility. The circuit 106 may be implemented as an enclosure. The enclosure 106 may include a number of storage devices (e.g., a drive array). The circuit 108 may be implemented as a controller. In one example, the circuit 108 may be a RAID (Redundant Array of Inexpensive Drives) controller. The circuit 108 may include a block (or module, or circuit) 109. The block 109 may be implemented as firmware that may control the controller 108. The block 109 may also include a processing utility that may operate in conjunction with the management utility 107 to implement the firmware updates discussed.

The host 102 may have an input/output 110 that may present a input/output request (e.g., REQ). The signal REQ may be sent through the network 104 to an input/output 112 of the controller 108. The controller 108 may have an input/output 114 that may present a signal (e.g., CTR) to an input/output 116 of the storage array 106.

The storage array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120n, 122a-122n, and 124a-124n may be implemented as a single drive, multiple drives, and/or one or more drive enclosures. The storage devices 120a-120n, 122a-122n and/or 124a-124n may be implemented as one or more hard disc drives (HDDs), one or more solid state devices (SSDs) or a combination of HDDs and SSDs. In one example, the storage devices 120a-120n may be implemented as Fibre Channel (FC) drives. In one example, the storage devices 122a-122n may be implemented as Serial Advanced Technology Attachment (SATA) drives. In one example, the storage devices 124a-124n may be implemented as Serial Attached SCSI (SAS) drives. The system 100 may comprise a heterogeneous matrix of drives. The storage devices 120a-120n may have a corresponding firmware block 128a-128n. The storage devices 122a-122n may have a corresponding firmware block 130a-130n. The storage devices 124a-124n may have a corresponding firmware block 132a-132n. Redundancy may be provided if the data is striped across the drives 120a-120n, 122a-122n, and/or 124a-124, such as in RAID 1, RAID 50, RAID 60, RAID 30, RAID 10 and/or RAID 01 volume groups.

Figure 2:
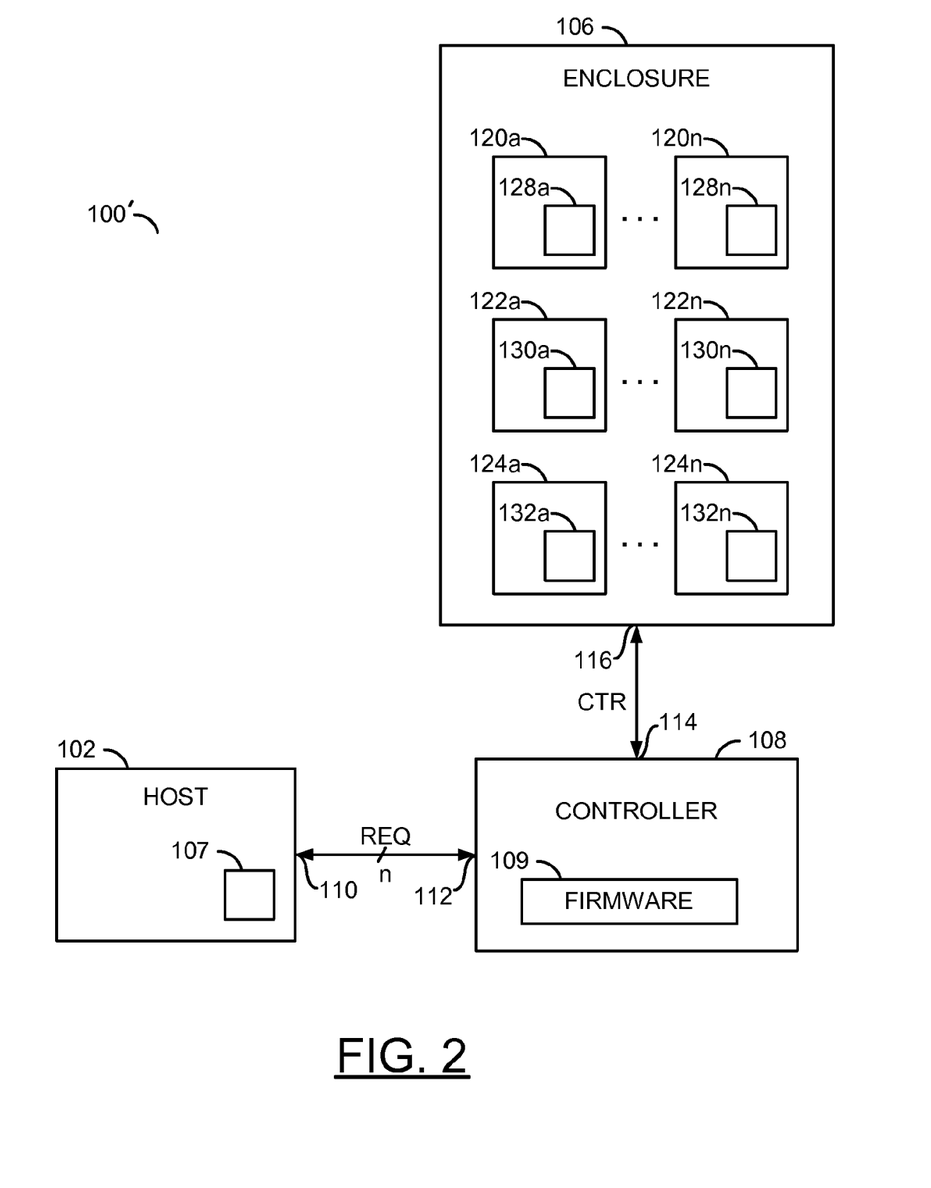
FIG. 2 is another diagram of a context of the present invention.

Referring to FIG. 2, a diagram of a system 100' is shown where the host is connected directly to the controller 108. Such a topology may be implemented as a Directly Attached Storage (DAS) configuration. The topology of FIG. 1 may be implemented as a Storage Area Network/Network Attached Storage (SAN/NAS) configuration. In the example shown, the host 102 is shown connected to the controller 108. However, in another example, the controller 108 may be implemented as a plug-in card that may be plugged into the host 102. The particular type of connection between the controller 108 and the host 102 may be varied to meet the design criteria of a particular implementation.

Figure 3:
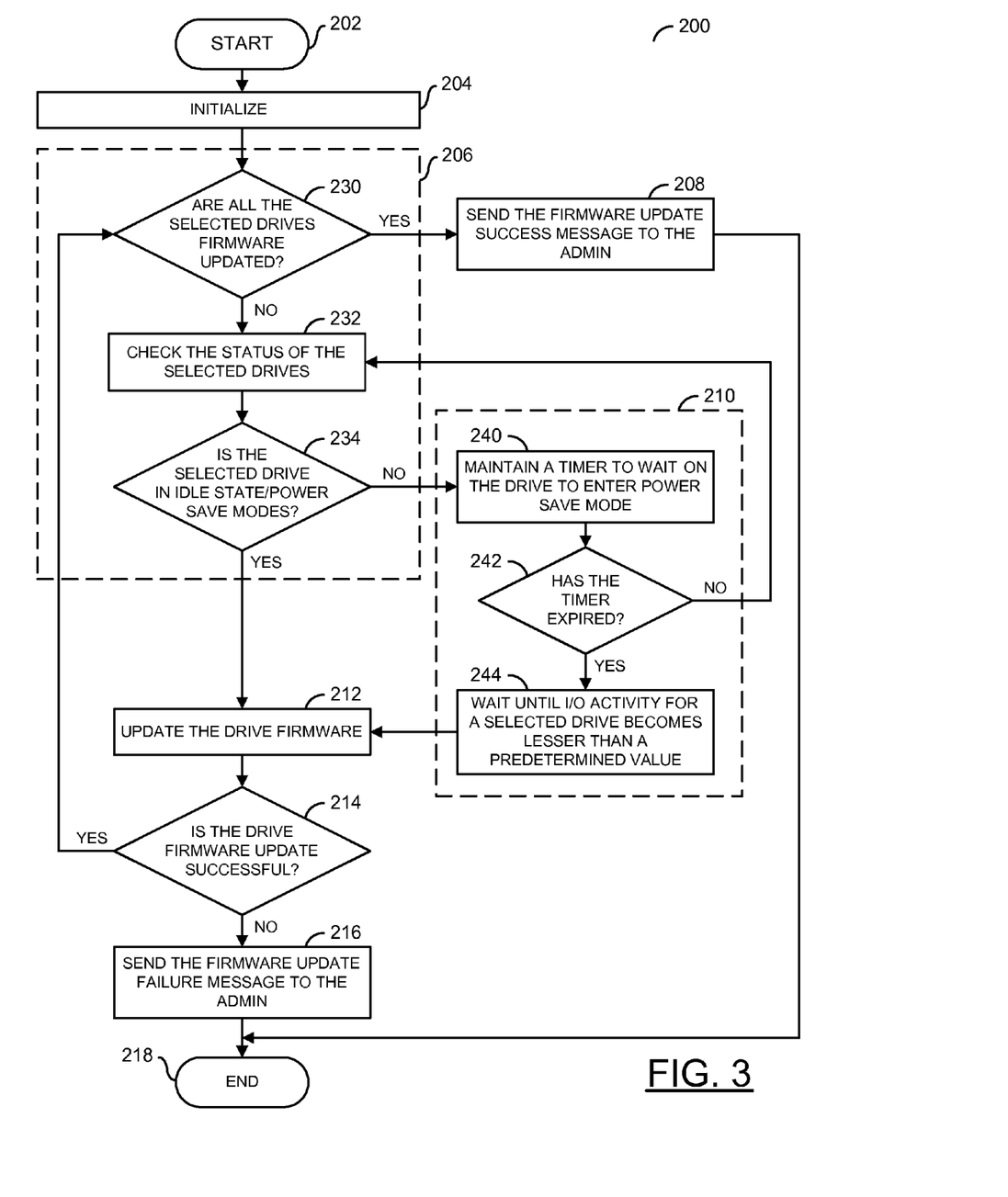
FIG. 3 is a flow diagram of an example implementation of the present invention.

Referring to FIG. 3, a flow diagram of a method 200 is shown. The method 200 generally comprises a step (or state) 204, a step (or state) 206, a step (or state) 208, a step (or state) 210, a step (or state) 212, a decision step (or state) 214, a step (or state) 216 and a step (or state) 218. The step 202 may be a start step. The step 204 may be an initialization step. The step 206 may be a decision step. The step 208 may send a message that the firmware has been successfully updated. The step 210 may be a timer state. The step 212 may initialize the update of the drive firmware. The decision step 214 may determine whether the drive update has been successful. If so, the method 200 moves back to the state 206 to determine if all the drives have been successfully updated. If not, the method 200 moves to the state 216. The state 216 may send a firmware update fail message to an administrator through the management utility 107. The state 218 may be in an end state.

The state 208 comprises a decision step (or state) 230, a step (or state) 232, and a decision step (or state) 234. The decision step 230 may determine if all of the selected drives have the updated firmware already updated. If so, the method 204 moves to the state 208. If not, the step 232 checks the status of the selected drives. Next, the decision step 234 determines if the selected drive is in an idle (or power down) mode. If so, the method 204 moves to the state 212 which initiates the drive firmware update. If not, the method 204 moves to the state 210.

The step 210 generally comprises a step (or state) 240, a decision step (or state) 242 and a step (or state) 244. The step 240 may maintain a timer configured to wait for a particular drive to enter a power down (or power save) mode. The decision step 242 determines whether a timer for each of the drives has expired. If so, the step 244 waits until the I/O activity on a particular drive becomes less than a predetermined amount (e.g., 30%). Next, the method 200 moves to the state 212. The timer state 210 may be implemented individually for each of the plurality of drives.

Figure 4:
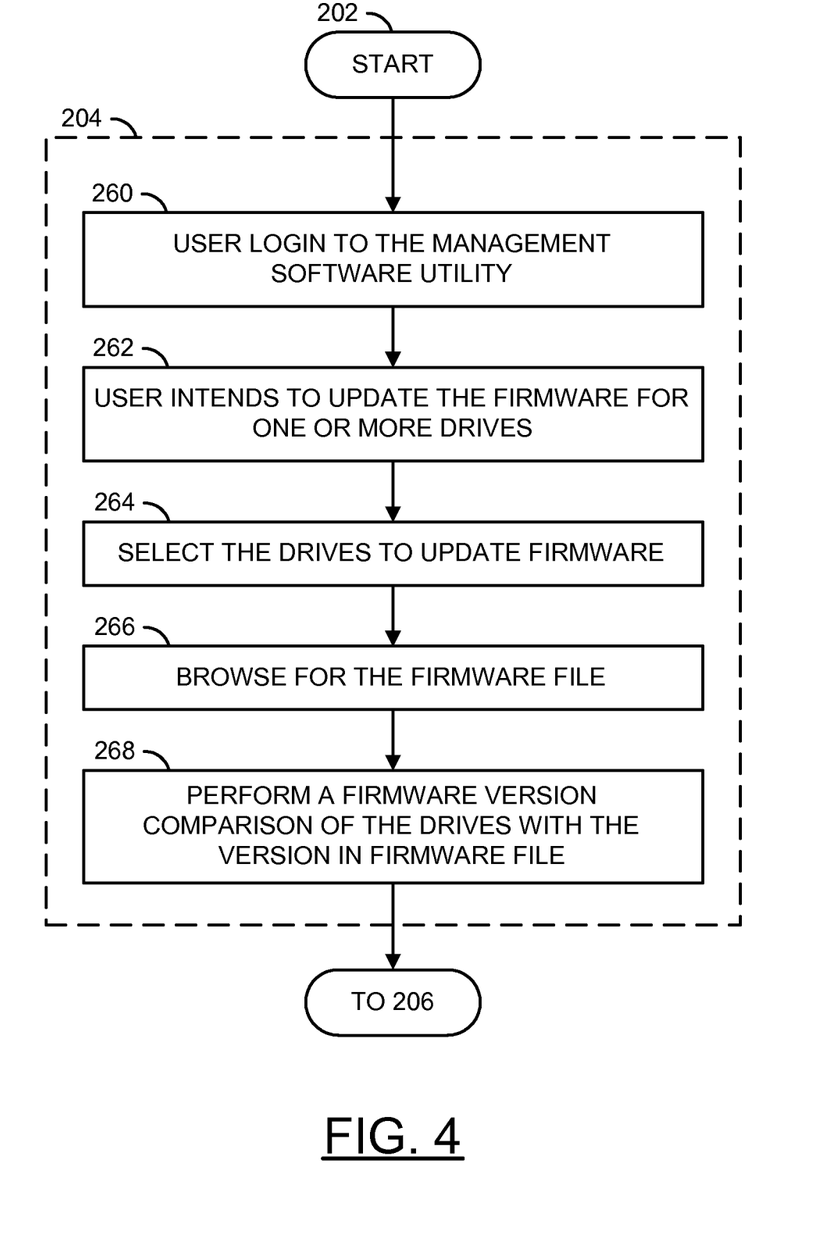
FIG. 4 is a flow diagram illustrating more details of the initialization step of FIG. 2.

Referring to FIG. 4, a more detailed diagram of the step 204 is shown. The step 204 generally comprises the sub-steps of a step (or state) 260, step (or state) 262, step (or state) 264, step (or state) 266, step (or state) 268. The step 260 may implement a user login to the management utility 107. The step 262 may allow a user to select which of the drives 120a-120n, 122a-122n, and/or 124a-124 the user intends to update. The step 264 may select a particular one of the drives 120a-120n, 122a-122n, and/or 124a-124 that the firmware needs to be updated. The step 266 may browse for a particular firmware file. The step 268 may perform a firmware version comparison of each of the drives 120a-120n, 122a-122n, and/or 124a-124 with the version of the firmware file. In general, the steps 260, 262, 264 and/or 266 may be performed on the management utility 107. The step 268 may also be performed on the management utility 107, but may have input received from the firmware 109 on the controller 108. The steps 206, 208, 210, 212, 214 and 216 may be performed on the firmware 109.

The method 200 may target a time to perform updates to the firmware 128a-128n, 130a-130n, and/or 132a-132n of the drives 120a-120n, 122a-122n and/or 124a-124n when in "Power Save" mode. By targeting a time when the drives are in an idle (or power save) mode, the method 200 normally avoids potential data corruption and/or I/O time outs which could potentially occur if the update is performed while heavy I/O is being performed. If one or more of the drives 120a-120n, 122a-122n and/or 124a-124n does not enter into Power Save mode after a significant time (e.g., a defined /pre-set time by user), the firmware update will be performed when the I/O activity on a particular one of the drives 120a-120n, 122a-122n and/or 124a-124n is less than a pre-set threshold (e.g., 30%). While a 30% threshold is described as an example, the particular pre-set threshold may be varied to meet the design criteria of a particular implementation.

Figure 5:
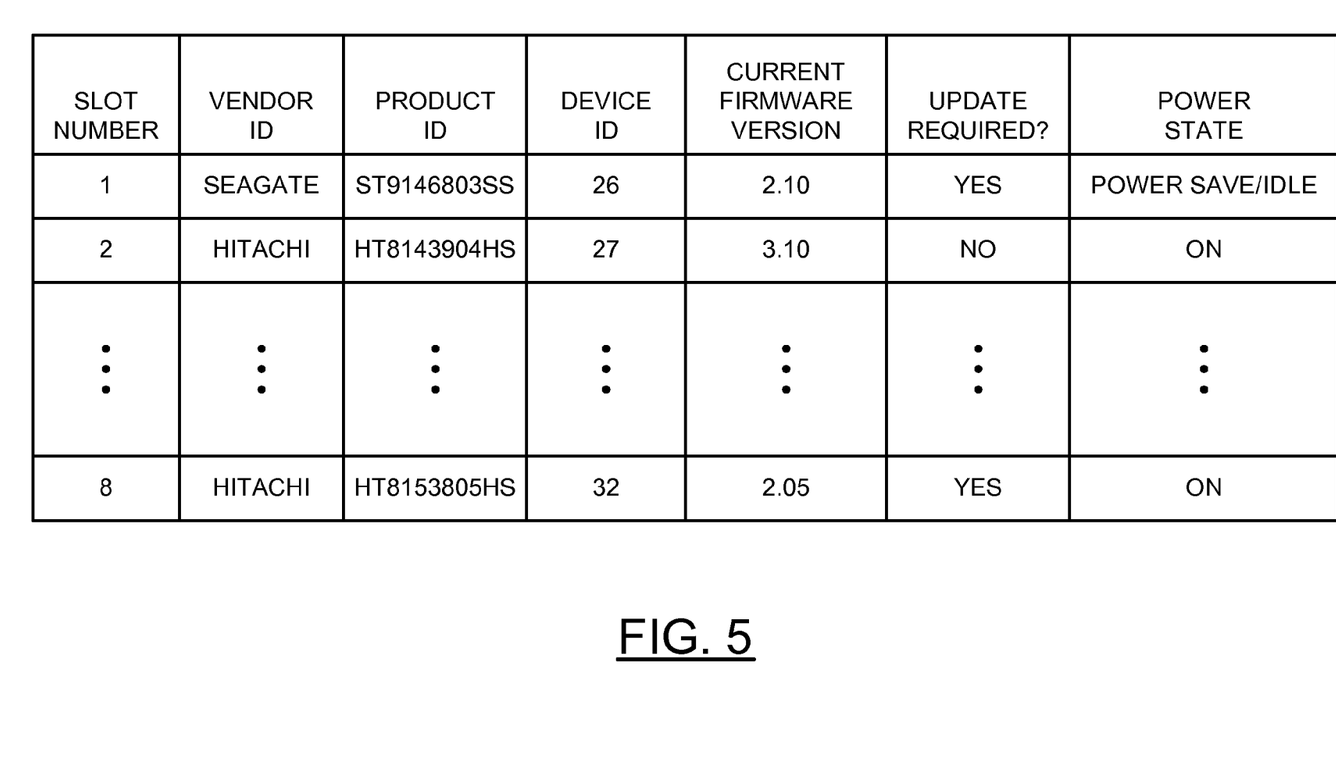
FIG. 5 is a diagram of a table illustrating a structure for a firmware update.

Referring to FIG. 5, a diagram illustrating a data structure for updating the firmware is shown. The first column generally shows a location of a particular drive (e.g., slot number 1, 2, etc.). The second column provides drive specific information, such as the vendor that manufactured the particular drive (e.g., Seagate, Hitachi, etc.). The next column generally represents a product ID, which may be a particular brand of drive. The next column may implement a device ID column which may represent a particular number of the device in the overall RAID (e.g., 26, 27, . . . 32, etc.). The next column illustrates the current version of the firmware installed on the particular drive of a particular row. In the case shown, the device 26 is shown having firmware version 2.1. The device 27 is shown having firmware version 3.10. The device 32 is shown having firmware version 2.05. The next column represents whether a firmware update is needed. If the current firmware to be installed is version 3.1, then device 27 does not need to be updated. In such an example, the devices 26 and 32 do need to be updated. Then the final column shows the power state of the particular drive. In this case, the drive device ID 26 is in the power save mode. Since the firmware update is needed, and the device 26 is in the power save mode, a firmware update may be initiated. For the device ID 27, since an update is not needed, the determination of the power state is not needed (e.g., "don't care"). For the device ID 32, the current firmware version is 2.05, so an update is needed. Since the power state is active, the device ID 32 should wait for a power save condition to occur.

The method 200 may work around the issue where one or more of the drives 120a-120n, 122a-122n and/or 124a-124n may never enter Power Save mode. For example, one or more critical I/O requests may be continuously (or nearly continuously) running on one or more of the drives 120a-120n, 122a-122n and/or 124a-124n. In such an example, the management application 107 may be configured to wait for a pre-set time (e.g., 12 hours, but a user may configure the particular number/time of the wait period) for the remaining drives 120a-120n, 122a-122n and/or 124a-124n to enter the Power Save mode. If the remaining drives 120a-120n, 122a-122n and/or 124a-124n do not enter into Power Save mode after the wait period, the management application 107 may start monitoring drive performance using a Drive Performance Monitor (DPM). When the activity of a particular drive 120a-120n, 122a-122n and/or 124a-124n goes less than the pre-set value (e.g., 30%) the management application 107 will push the drive firmware update avoiding any I/O delay.

In general, the method 200 will start when a user intends to update the firmware on one or more of the drives 120a-120n, 122a-122n and/or 124a-124n. The management utility 107 may be implemented as a storage management application (e.g., MSM, Megacli, etc.). A user may select one or more of the drives 120a-120n, 122a-122n and/or 124a-124n intended to be updated. The user will normally browse a number of available firmware files and select the firmware file to be used for the update.

The firmware 109 will compare the current firmware version on each of the drives 120a-120n, 122a-122n and/or 124a-124n to the selected firmware version. If the versions are the same, the particular drives 120a-120n, 122a-122n and/or 124a-124n that have the same firmware version will be dropped from list. The firmware 109 will then automatically create a new list of drives 120a-120n, 122a-122n and/or 124a-124n that need an update.

The management application 107 and/or the firmware 109 will then use the new list to determine which of the drives 120a-120n, 122a-122n and/or 124a-124n are in "Power Save" mode. For the drives 120a-120n, 122a-122n and/or 124a-124n which are identified as being in Power Save mode, a firmware update will be implemented. AEN will be generated for the successful firmware update.

After a first pass of updates, the management application 107 and/or the firmware 107 will again update the list of remaining drive/drives which are currently not in Power Save mode and also have drive firmware update marked "pending" for these drives. The firmware 109 may then start a timer (e.g., the step 210). The timer may represent a threshold time defined by user as to how long to wait before the remaining drives 120a-120n, 122a-122n and/or 124a-124n enter to "Power Save" mode.

The management application 107 and/or firmware 109 will push the firmware update to drives 120a-120n, 122a-122n and/or 124a-124n that go into Power Save mode within the threshold time. The management application 107 and/or the firmware 109 will drop the update drives 120a-120n, 122a-122n and/or 124a-124n from the list and prepare a new list.

When the threshold time defined by user is over, the management application 107 may implement a DPM (drive performance monitoring) feature to check I/O activity on the remaining drives. The management application 107 may then push a drive firmware update whenever I/O activity is less than 30% (or other threshold) on a drive.

The functions performed by the diagrams of FIGS. 3 and 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program, modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for updating firmware in one or more drives of a drive array, comprising the steps of:
   (A) initiating a request to apply a firmware update to a selected sub-set of drives of a plurality of drives in said drive array, wherein one or more drives of said selected sub-set are in an active state and one or more drives of said selected sub-set are in an idle state;
   (B) determining which drives of said selected sub-set are in said idle state;
   (C) sending said firmware update to said drives of said selected sub-set determined to be in said idle state;
   (D) repeating steps (B) and (C) for a predetermined time set by a user or until all of said drives of said selected sub-set have been updated, wherein said predetermined time is separately defined for each drive of said selected sub-set to avoid interrupting critical I/O requests;
   (E) determining whether one or more drives of said selected sub-set fails to enter said idle state within said predetermined time; and
   (F) applying said firmware update if I/O activity in said drive becomes less than a predetermined amount.

2. The method according to claim 1, wherein said drive array comprises a redundant array of inexpensive disks (RAID).

3. The method according to claim 1, wherein step (A) further comprises selecting a particular firmware file from a plurality of firmware files to apply to each drive of said selected sub-set.

4. The method according to claim 1, wherein said idle state comprises a state with little or no I/O activity.

5. The method according to claim 1, wherein said idle state comprises a power down state.

6. An apparatus for updating firmware in one or more drives of a drive array, comprising the steps of:
   means for initiating a request to apply a firmware update to a selected sub-set of drives of a plurality of drives in said drive array, wherein one or more drives of said selected sub-set are in an active state and one or more drives of said selected sub-set are in an idle state;

means for determining which drives of said selected sub-set are in an idle state;

means for sending said firmware update to said drives of said selected sub-set determined to be in said idle state;

means for repeating said determining and said sending for a predetermined time set by a user or until all of said drives of said selected sub-set have been updated, wherein said predetermined time is separately defined for each of said drives of said selected sub-set to avoid interrupting critical I/O requests;

means for determining whether one or more drives of said selected sub-set fails to enter said idle state within said predetermined time; and means for applying said firmware update if I/O activity in said drive becomes less than a predetermined amount.

7. An apparatus comprising:

a management utility on a host computer configured to initiate a request to apply a firmware update to a selected sub-set of drives of a plurality of drives in an array, wherein one or more drives of said selected sub-set are in an active state and one or more drives of said selected sub-set are in an idle state; and a processing utility on a drive controller configured to (i) determine which drives of said selected sub-set are in an idle state, (ii) send said firmware update to said drives of said selected sub-set determined to be in said idle state, (iii) repeat (i) and (ii) for a predetermined time set by a user or until all of said drives of said selected sub-set have been updated, wherein said predetermined time is separately defined for each of said drives of said selected sub-set to avoid interrupting critical I/O requests, (iv) determine whether one or more drives of said selected sub-set fails to enter said idle state within said predetermined time and (v) apply said firmware update if I/O activity in said drive becomes less than a predetermined amount.

8. The apparatus according to claim 7, wherein said host computer is connected to said controller through a network in a Storage Area Network/Network Attached Storage (SAN/NAS) configuration.

9. The apparatus according to claim 7, wherein said host computer is connected directly to said controller in a Directly Attached Storage (DAS) configuration.

10. The apparatus according to claim 7, wherein said array comprises a redundant array of inexpensive disks (RAID).

11. The apparatus according to claim 7, wherein said apparatus is further configured to select a particular firmware file from a plurality of firmware files to apply to each drive of said selected sub-set.

12. The apparatus according to claim 7, wherein said idle state comprises a state with little or no I/O activity.

13. The apparatus according to claim 7, wherein said idle state comprises a power down state.

14. The method according to claim 1, wherein said selected sub-set of drives is selected by said user using a management utility.

15. The method according to claim 1, wherein a management utility performs a firmware version comparison of drives of said selected sub-set and a firmware file.

16. The method according to claim 15, wherein said management utility receives input from firmware on a RAID controller.

17. The method according claim 1, wherein step (F) further comprises a management utility pushing said firmware update.

18. The apparatus according to claim 7, wherein said user selects said selected sub-set using said management utility.

19. The apparatus according to claim 7, wherein said management utility performs a firmware version comparison of drives of said selected sub-set and a firmware file.

20. The apparatus according to claim 7, wherein said drive controller is a RAID controller.

* * * * *